(12) United States Patent
Lanner et al.

(10) Patent No.: US 10,162,619 B1
(45) Date of Patent: Dec. 25, 2018

(54) FLEET-WIDE MANAGEMENT OF SOFTWARE PACKAGES

(71) Applicant: Amazon Technologies, Inc., Seattle, WA (US)

(72) Inventors: Mats Erik Lanner, Seattle, WA (US); Sivaprasad Venkata Padisetty, Bellevue, WA (US); Amjad Hussain, Bellevue, WA (US); Daniel Francis Conde, Seattle, WA (US); Steven Merlin Twitchell, Renton, WA (US); Aaron Jeremiah Sheldon, Seattle, WA (US); Alan Hadley Goodman, Issaquah, WA (US); Derek Kwiatkowski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 15/045,035

(22) Filed: Feb. 16, 2016

(51) Int. Cl.
*G06F 9/445* (2018.01)
*G06F 8/61* (2018.01)

(52) U.S. Cl.
CPC ..................... *G06F 8/61* (2013.01)

(58) Field of Classification Search
CPC ......................................... G06F 8/61
USPC .................................. 717/168–178
See application file for complete search history.

(56) References Cited

U.S. PATENT DOCUMENTS

| | | | |
|---|---|---|---|
| 6,912,711 B1 | 6/2005 | Curtis et al. | |
| 7,802,246 B1 | 9/2010 | Kennedy et al. | |
| 8,010,777 B2 * | 8/2011 | Nandan | G06F 8/61 |
| | | | 709/220 |
| 8,230,222 B2 * | 7/2012 | Celli | G06F 21/125 |
| | | | 380/286 |
| 8,341,619 B2 | 12/2012 | Pall et al. | |
| 8,458,690 B2 * | 6/2013 | Zhang | G06F 8/65 |
| | | | 717/171 |
| 9,170,806 B2 | 10/2015 | Gocek et al. | |
| 9,182,966 B2 | 11/2015 | Avery et al. | |
| 9,450,700 B1 * | 9/2016 | Van Tonder | H04L 41/046 |

OTHER PUBLICATIONS

Curry et al., "Deploying Web Applications in Enterprise Scenarios", 2012, retrieved from http://www.asp.net/web-forms/tutorials/deployment/deploying-web-applications-in-enterprise-scenarios/deploying-web-applications-in-enterprise-scenarios , 269 pages.*

(Continued)

*Primary Examiner* — Ted T. Vo
(74) *Attorney, Agent, or Firm* — Robert C. Kowert; Meyertons, Hood, Kivlin, Kowert & Goetzel, P.C.

(57) ABSTRACT

Methods, systems, and computer-readable media for fleet-wide management of software packages are disclosed. A package management service is offered to a plurality of clients in a multi-tenant environment. Using the package management service, a package set is determined that comprises metadata identifying a plurality of software packages and desired states associated with the software packages. The software packages are from a catalog. Deployment of the package set is initiated to a plurality of computing devices. The deployment comprises reaching the desired states for the software packages in the package set for the computing devices.

20 Claims, 9 Drawing Sheets

(56) References Cited

OTHER PUBLICATIONS

Stephen Owen, "Desired State Configuration—What it is and why you should care", Mar. 2014, retrieved from Foxdeploy.com, 15 pages.*

Thompson, "PowerShell Desired State Configuration (DSC)", Sep. 2013, retrieved from http://www.systemcenterentral.com/powershell-desired-state-configuration-dsc , 6 pages.*

Syneto, "Whitelist and Blacklist Rules", Feb. 2012, retrieved from https://syneto.eu/knowledgebase/whitelist-blacklist-rules , 4 pages.*

* cited by examiner

FLEET-WIDE MANAGEMENT OF SOFTWARE PACKAGES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. A distributed system referred to as a provider network may offer, to various customers, access to computing resources and services implemented using the distributed system. When customers access such resources remotely, the resources may be said to reside "in the cloud" and may represent cloud computing resources. For example, using such resources, the provider network may execute programs on behalf of customers. Updates may be issued periodically for programs deployed in such an environment.

Figure 1:
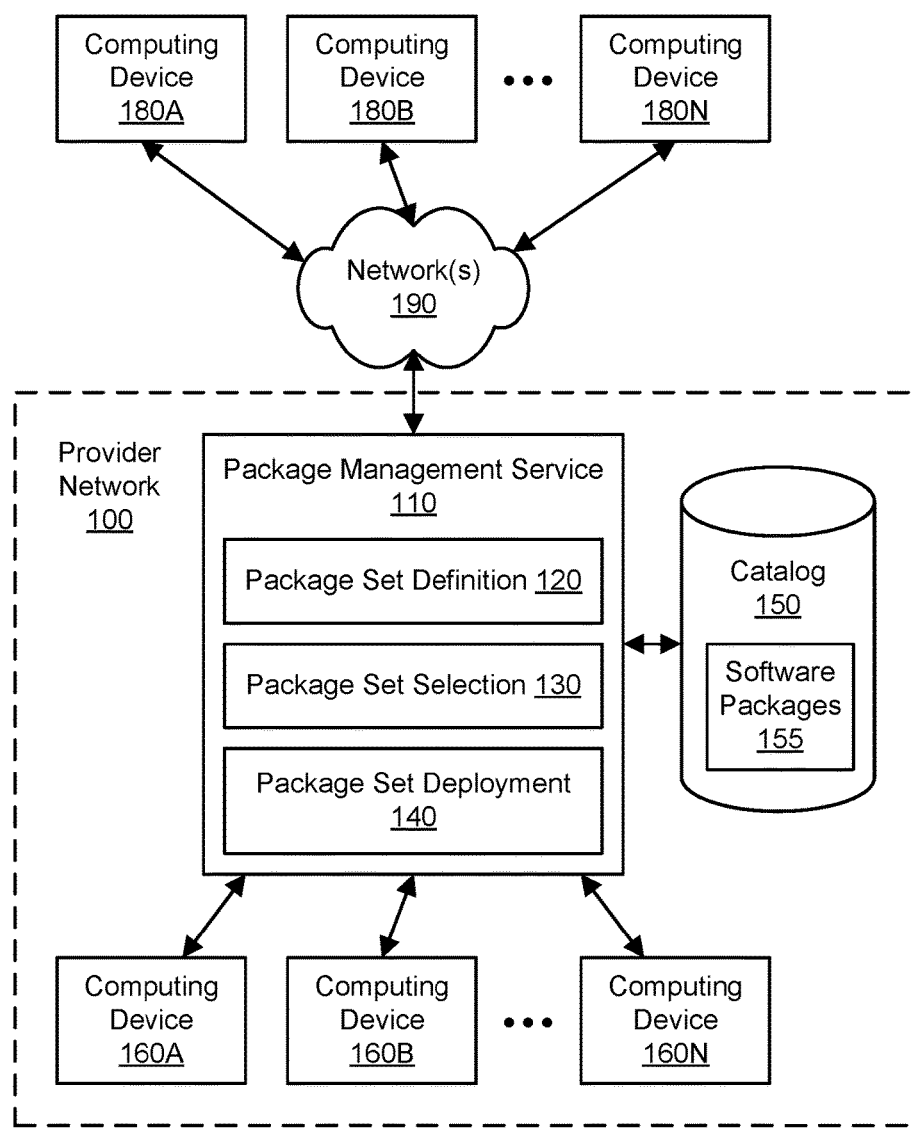
FIG. 1 illustrates an example system environment for fleet-wide management of software packages, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for fleet-wide management of software packages are described. Using the techniques described herein, a package set comprising software packages may be deployed to a fleet of computing devices such that a desired state is reached for the software packages. The software packages may include standalone applications, patches, updaters, installers, uninstallers, other suitable types of software components, and/or combinations or sets thereof. The desired states may represent installation instructions, e.g., to install an update if a particular software package is present, to install a particular version of a software package, to install the latest version of a software package, to uninstall a particular software package (if present), to determine the installation status of a software package, and other suitable instructions. Package management clients on the computing devices may assist in the deployment, e.g., by evaluating the initial states of the computing devices and determining any operations to perform to reach the desired states. The individual computing devices in the fleet may vary in their initial states prior to deployment, and the individual computing devices may also vary in their states after deployment of a package set. For example, if the desired state of a particular software package is to update it only if it is already present on a computing device, then one computing device may be updated while another computing device may be left alone (with respect to the particular software package). The software packages may be sourced from a catalog. The catalog may comprise a global catalog that is fully accessible to privileged users and one or more private catalogs that are accessible to additional users. In one embodiment, a privileged user may test and/or approve software packages in the global catalog and add them to one or more private catalogs. The additional users may deploy package sets using the packages in the private catalogs to which they have access. In this manner, software packages may be securely maintained throughout a fleet of computing devices (potentially including heterogeneous devices).

FIG. 1 illustrates an example system environment for fleet-wide management of software packages, according to one embodiment. A package management service 110 may manage the deployment of software packages throughout a fleet of computing devices, including heterogeneous devices. In one embodiment, the software packages may be deployed to computing devices such as devices 160A-160N that are part of a provider network 100. The provider network 100 may offer access to resources and services, such as a package management service 110, using multi-tenancy. In one embodiment, the software packages may be deployed to computing devices such as devices 180A-180N that are external to the provider network 100 and that are managed by clients of the provider network. The computing devices 180A-180N may be coupled to the provider network 100 via one or more networks 190. The computing devices 180A-180N may be associated with one or more clients of the provider network 100 and/or package management service 110. A client may represent a customer (e.g., an individual or group) of the provider network 100.

For use with the package management service 110, the definition of a fleet may vary based on administrator requirements, and those requirements may vary based on the nature of the service or solution being managed. For example, in an environment that is used to implement a mail server such as Microsoft Exchange, the package management service 110 may be used to manage fleets at a DAG (Database Availability Group) level, where each DAG is potentially divided into two or more fleets. As another example, in an environment that is used to implement a web application platform such as Microsoft SharePoint, the package management service 110 may be used to manage fleets having a different structure or configuration than the Exchange fleet(s).

The package management service 110 may be communicatively coupled to a catalog 150 of software packages 155. The catalog 150 may store the actual software packages 155 (e.g., deployable and/or executable program code) and/or metadata identifying and linking to the software packages. The software packages 155 may include standalone applications, patches, updaters, installers, uninstallers, other suitable types of software components, and/or combinations or sets thereof. A software package may represent a specific version of a piece of software, such as a specific patch for a specific operating system from a specific publisher, a version of the paravirtual drivers for Amazon Web Services (AWS), or a specific release of application software. Each entry in the catalog 150 or in a package set may represent a particular software package. The catalog 150 may be accessed by a user (e.g., a user of the package management service 110) or by the package management service on behalf of the user. The user may have access privileges to the entire catalog (also referred to herein as the main catalog) or only to particular portions of the catalog. The catalog 150 may be populated with metadata describing the software packages 155 (e.g., names, publishers, version numbers, summaries of functionality, installation requirements, and so on) as well as links to obtain the actual software packages, potentially in one or more other networks and/or storage systems. The catalog 150 may include different numerical versions of the same software package or other variations of the same software, such as platform-specific versions for different platforms. Descriptions of individual software packages may be available for searching and browsing in different portions of the catalog 150, potentially including a global catalog that may be fully accessible only to privileged users and/or one or more private catalogs that are accessible to particular sets of users. The software packages 155 may be approved for deployment by users who have access to the particular portion of the catalog 150 in which those packages are classified (e.g., a private catalog within the main catalog). In one embodiment, software packages approved for deployment may be available to users in one or more private catalogs or other portions of the main catalog.

The package management service 110 may include a functionality for package set definition 120 and a functionality for package set selection 130. Using the functionality for package set definition 120, a user may create and/or modify one or more package sets. Using the functionality for package set selection 130, a user may select one or more pre-existing package sets (e.g., as maintained by the package management service 110 and/or catalog 150). A package set may include metadata identifying one or more software packages and a desired state for each of the software packages. The software packages may be sourced from the catalog 150, and the package set may include links or other references to obtain the actual software packages for deployment. The package set may be defined by creating a new package set and adding one or more software packages to it or by selecting and modifying a previously created package set (e.g., by adding one or more software packages, removing one or more software packages, and/or changing the desired state of any software package). In one embodiment, a package set defined or deployed by a particular user may include only those software packages to which the user has been granted access in the catalog 150.

A desired state may represent one or more instructions, including installation instructions, with respect to a particular software package on a particular target computing device. The instructions may be conditional and may thus require evaluation of an initial state of the target device. For example, a particular desired state may represent an instruction to install an update if a particular software package is present on the target device. As another example, a particular desired state may represent an instruction to install a particular version of a software package or to install the latest version of a software package. As yet another example, a particular desired state may represent an instruction to uninstall a particular software package if present on a target device. As a further example, a particular desired state may represent an instruction to determine the installation status of a software package (e.g., whether the package is present or not) but not necessarily take any action to modify the target device.

The package management service 110 may include a functionality for package set deployment 140. The package set deployment 140 may initiate the deployment of a package set to a fleet of computing devices such as provider network devices 160A-160N and/or client computing devices 180A-180N. The deployment may be initiated by the user who selected and/or defined the package set. The fleet may be heterogeneous in terms of capabilities and/or configurations in hardware and/or software. The individual computing devices in the fleet may be selected by the user as part of the deployment. In one embodiment, the package management service 110 may orchestrate the deployment in conjunction with client-side components on the target computing devices, such as package management client software. Each of the computing devices in the fleet (such as devices 160A-160N and/or devices 180A-180N) may include one or more package management clients, and the package management clients may vary from computing device to computing device.

The provider network 100 may be set up by an entity such as a company or a public sector organization to provide one or more services (such as various types of cloud-based computing or storage) accessible via the Internet and/or other networks to computing devices 160A-180N. Provider network 100 may include numerous data centers hosting various resource pools, such as collections of physical and/or virtualized computer servers, storage devices, networking equipment and the like (e.g., implemented using computing system 3000 described below with regard to FIG. 8), needed to implement and distribute the infrastructure and services offered by the provider network. In some embodiments, provider network 100 may provide computing resources, such as package management service 110 and servers 160A-160N; storage services, such as a block-based storage service, key-value based data stores or various types of database systems; and/or any other type of network-based services. Computing devices 180A-180N may access these various services offered by provider network 100 via network(s) 190. Likewise, network-based services may themselves communicate and/or make use of one another to provide different services. For example, computing resources offered to computing devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using computing devices 180A-180N) may access or use a particular resource in a substantially simultaneous manner. For example, the package management service 110 may be offered to multiple clients (in a substantially simultaneous manner) in such a multi-tenant provider network 100, such that the same computational and storage resources associated with the package management service may be used on behalf of different clients over the same window of time. The different clients may represent different individuals and/or different organizations that may pay the provider network for access to one or more services and/or resources.

The provider network 100 may include a fleet of computing devices 160A-160N, also referred to herein as servers, hosts, or instances, which are configured to execute software on behalf of clients of the provider network. In one embodiment, a fleet of servers 160A-160N may grow or shrink as individual servers are provisioned or deprovisioned using resources of the provider network 110. In one embodiment, the fleet of servers 160A-160N may grow or shrink as individual servers are added to or removed from a dedicated fleet by an administrator. The computing devices 160A-160N may be heterogeneous in terms of their computing hardware and/or software configurations.

The computing devices 180A-180N may represent or correspond to various clients or users of the provider network 100, such as customers who seek to use services offered by the provider network. The clients, users, or customers may represent persons, businesses, other organizations, and/or other entities. The computing devices 180A-180N may encompass any type of client configurable to submit requests to provider network 100. For example, a given computing device may include a suitable version of a web browser, or it may include a plug-in module or other type of code module configured to execute as an extension to or within an execution environment provided by a web browser. In one embodiment, a computing device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, computing devices 180A-180N may be configured to generate network-based service requests according to a Representational State Transfer (REST)-style network-based services architecture, a document- or message-based network-based services architecture, or another suitable network-based services architecture. In some embodiments, computing devices 180A-180N (e.g., a computational client) may be configured to provide access to a virtual compute instance in a manner that is transparent to applications implement on the computing device utilizing computational resources provided by the virtual compute instance. In at least some embodiments, computing devices 180A-180N may provision, mount, and configure storage volumes implemented at storage services for file systems implemented at the computing devices.

Computing devices 180A-180N may convey network-based service requests to provider network 100 via external network(s) 190. In various embodiments, external network(s) 190 may encompass any suitable combination of networking hardware and protocols necessary to establish network-based communications between computing devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given computing device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the provider network 100. It is noted that in some embodiments, computing devices 180A-180N may communicate with provider network 100 using a private network rather than the public Internet.

Figure 8:
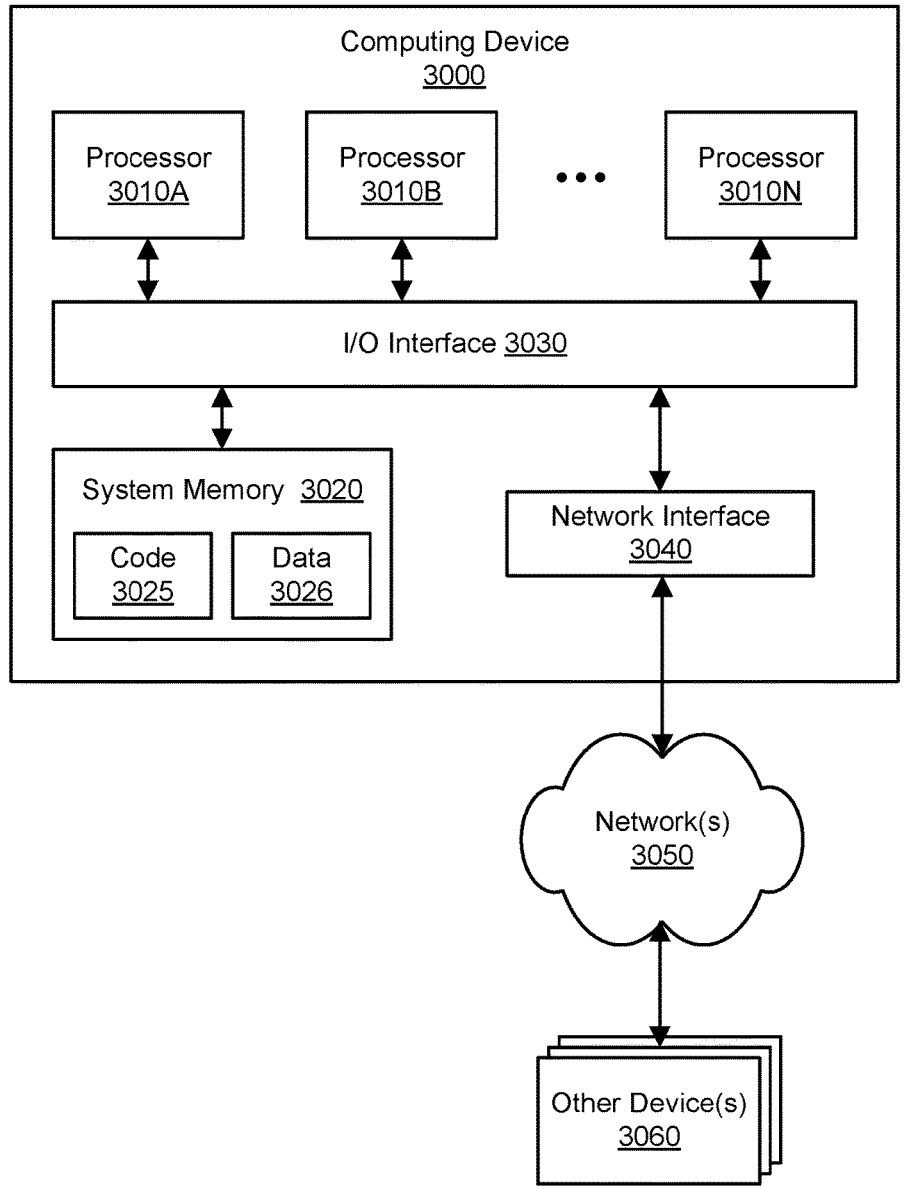
FIG. 8 illustrates an example computing device that may be used in some embodiments.

The provider network 100 may include a plurality of computing devices, any of which may be implemented by the example computing device 3000 illustrated in FIG. 8. For example, one or more computing devices that execute the package management service 110 may be implemented using the example computing device 3000 illustrated in FIG. 8. Similarly, any of the computing devices 160A-160N and/or 180A-180N may be implemented using the example computing device 3000 illustrated in FIG. 8. In various embodiments, portions of the described functionality of the provider network 100, including the package management service 110 and catalog 150, may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the package management service 110 and its constituent functionalities) may represent any combination of software and hardware usable to perform their respective functions.

It is contemplated that the provider network 100 may include additional components not shown, fewer components than shown, or different combinations, configurations, or quantities of the components shown. For example, although computing devices 160A and 160B through 160N are shown for purposes of example and illustration, it is contemplated that different quantities and configurations of computing devices may be used. Additionally, although three client computing devices 180A, 180B, and 180N are shown for purposes of example and illustration, it is contemplated that different quantities and configurations of client computing devices may be used. Aspects of the functionality described herein may be performed, at least in part, by components outside of the provider network 100.

Figure 2:
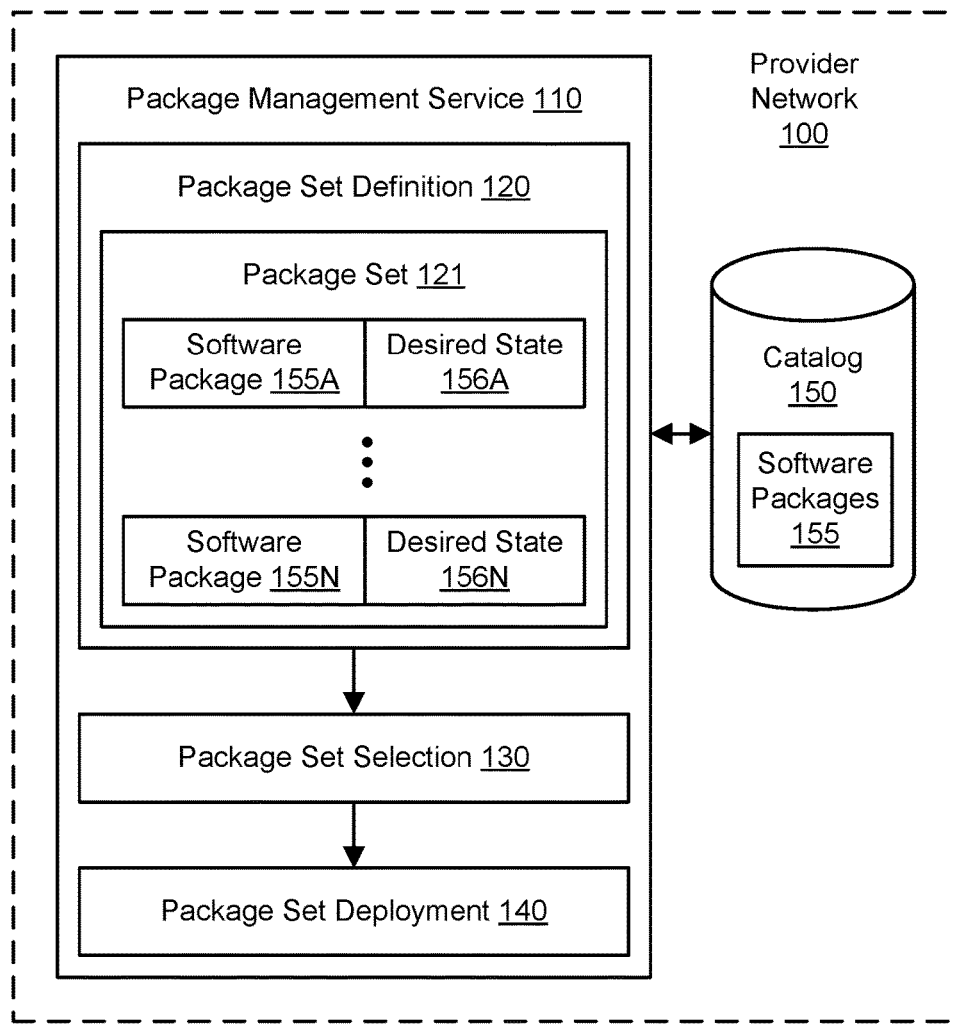
FIG. 2 illustrates further aspects of the example system environment for fleet-wide management of software packages, including definition of a package set comprising a plurality of software packages and corresponding desired states, according to one embodiment.

FIG. 2 illustrates further aspects of the example system environment for fleet-wide management of software packages, including definition of a package set comprising a plurality of software packages and corresponding desired states, according to one embodiment. As discussed above, a package set may include metadata identifying one or more software packages and a desired state for each of the software packages. For example, as shown in FIG. 2, a package set 121 may include a plurality of software packages such as software package 155A through software package 155N. A desired state may be indicated in the package set 121 for each of the software packages, such as desired state 156A for software package 155A and desired state 156N for software package 155N. The package set 121 may include any suitable number and configuration of software packages. The software packages 155A-155N may be sourced from the catalog 155. The package set 121 may include links or other references to obtain the actual software packages 155A-155N for deployment. The package set 121 may be determined by creating a new package set and adding one or more software packages to it, selecting a previously created package set (e.g., as maintained by the package management service and/or catalog), or by selecting and modifying a previously created package set (e.g., by adding one or more software packages, removing one or more software packages, and/or changing the desired state of any software package). In one embodiment, a package set 121 created by a particular user may include only those software packages to which the user has been granted access in the catalog 150. Using the package set selection functionality 130, a defined package set 121 may be selected by the same user or a different user with suitable access privileges. Using the package set deployment functionality 140, a defined and/or selected package set 121 may be deployed to a fleet of computing devices such that the desired states 156A-156N for the software packages 155A-155N are reached for each of the target devices. The same package set 121 may be deployed to multiple fleets, potentially at different times and potentially on behalf of different users or clients.

As discussed above, each of the desired states 156A-156N may represent one or more instructions, including installation and/or uninstallation instructions, with respect to corresponding software packages 155A-155N for a target computing device. The desired states 156A-156N may be selected from a predetermined set of available desired states. In one embodiment, desired states selected from the set may be customized, e.g., to establish conditions for installation or uninstallation. The instructions may be conditional and may thus require evaluation of an initial state of the target device. For example, a particular desired state may represent an instruction to install an update if a particular software package is present on the target device. As another example, a particular desired state may represent an instruction to install a particular version of a software package or to install the latest version of a software package. As yet another example, a particular desired state may represent an instruction to uninstall a particular software package if present on a target device. As a further example, a particular desired state may represent an instruction to determine the installation status of a software package but not necessarily take any action to modify the target device.

Figure 3A:
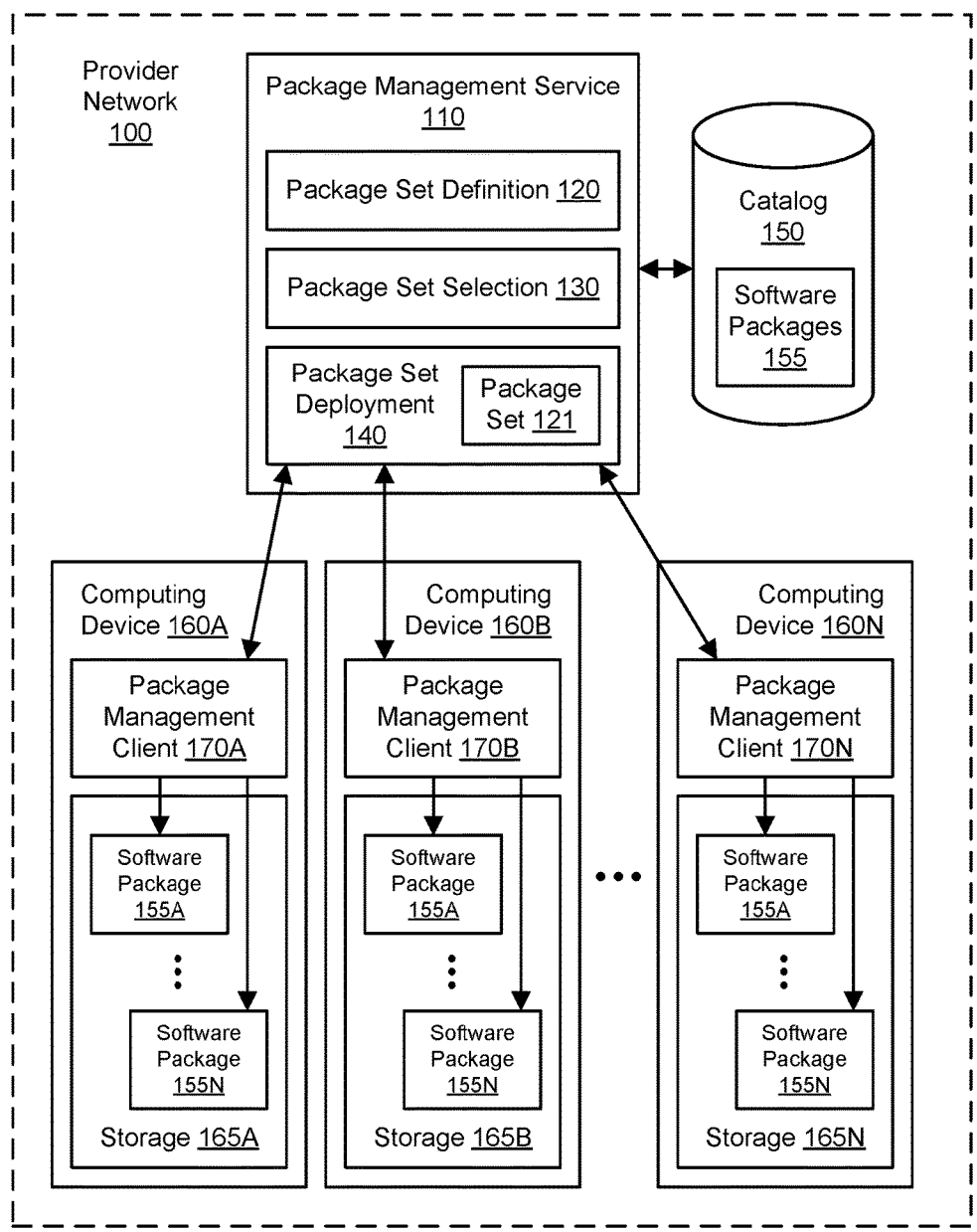
FIG. 3A illustrates further aspects of the example system environment for fleet-wide management of software packages, including deployment of a package set within a provider network to reach the desired states for a plurality of software packages throughout a fleet of computing devices, according to one embodiment.
Figure 3B:
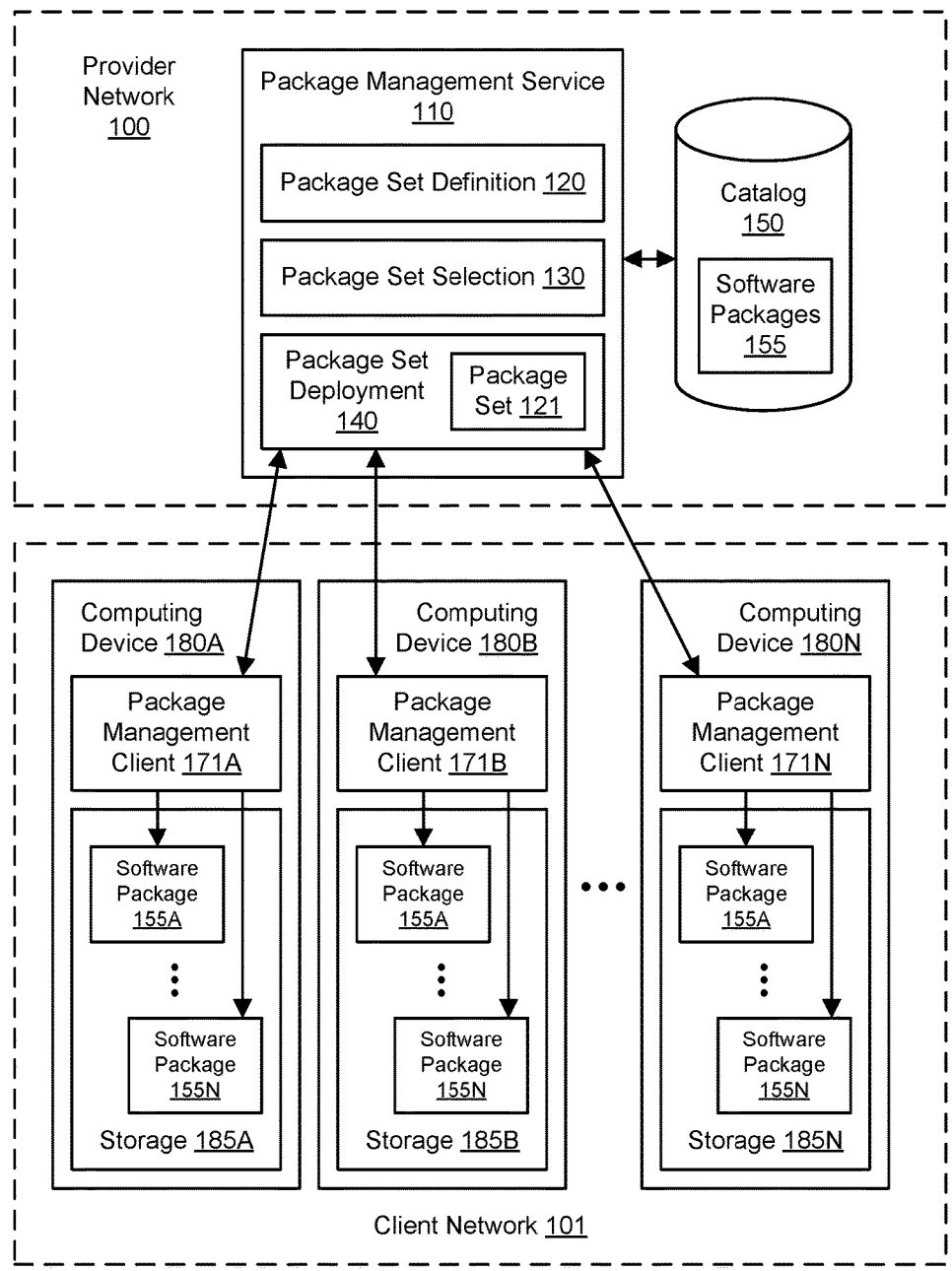
FIG. 3B illustrates further aspects of the example system environment for fleet-wide management of software packages, including deployment of a package set within a client network to reach the desired states for a plurality of software packages throughout a fleet of computing devices, according to one embodiment.

FIG. 3A illustrates further aspects of the example system environment for fleet-wide management of software packages, including deployment of a package set within a provider network to reach the desired states for a plurality of software packages throughout a fleet of computing devices, according to one embodiment. As discussed above, the deployment of a package set 121 may be performed to reach the desired states 156A-156N for the software packages 155A-155N throughout the individual computing devices in a fleet. As shown in the example of FIG. 3A, the package set 121 may be deployed to computing devices 160A-160N within the provider network 100. As shown in the example of FIG. 3B, the package set 121 may be deployed to computing devices 180A-180N external to the provider network 100, e.g., within a client network 101.

Each of the computing devices in the fleet (such as devices 160A-160N and/or devices 180A-180N) may include one or more package management clients, and the package management clients may vary from computing device to computing device. As shown in FIG. 3A, package management clients 170A-170N on the computing devices 160A-160N may assist in the deployment. Similarly, as shown in FIG. 3B, package management clients 171A-171N on the computing devices 180A-180N may assist in the deployment. For example, each of the package management clients may evaluate the current states of the corresponding computing devices prior to deployment, determine any operations to perform in order to reach the desired states (by transforming them from the current states), and implement those operations. For example, if the desired state of a particular software package is to update it only if it is already present on a computing device, then deployment may include determining whether that package is already present on each target device. One computing device on which the package is already present may then be updated, while another computing device on which the package is not present may be left alone (with respect to the particular software package). The individual computing devices in the fleet may vary in their initial states prior to deployment, and the individual computing devices may also vary in their states after deployment of a package set. Each of the computing devices may include storage for software packages, such as storage 165A-165N for computing devices 160A-160N and storage 185A-185N for computing devices 180A-180N. The storage 165A-165N and 185A-185N may represent local storage (e.g., storage installed in or directly attached to the computing device) or other storage to which the corresponding computing device has access (e.g., network-attached storage or storage managed by a storage service external to the computing device). In one embodiment, an initial state of the storage 165A-165N or 185A-185N may be transformed to the desired state for each of the software packages 155A-155N as indicated in the package set 121. For example, the software packages 155A-155N may include operating system updates that are installed on all of the computing devices 160A-160N or 180A-180N based on instructions in the package set 121. As another example, the storage 165A-165N or 185A-185N may be transformed to the desired state by uninstalling existing software packages, if present.

Figure 4:
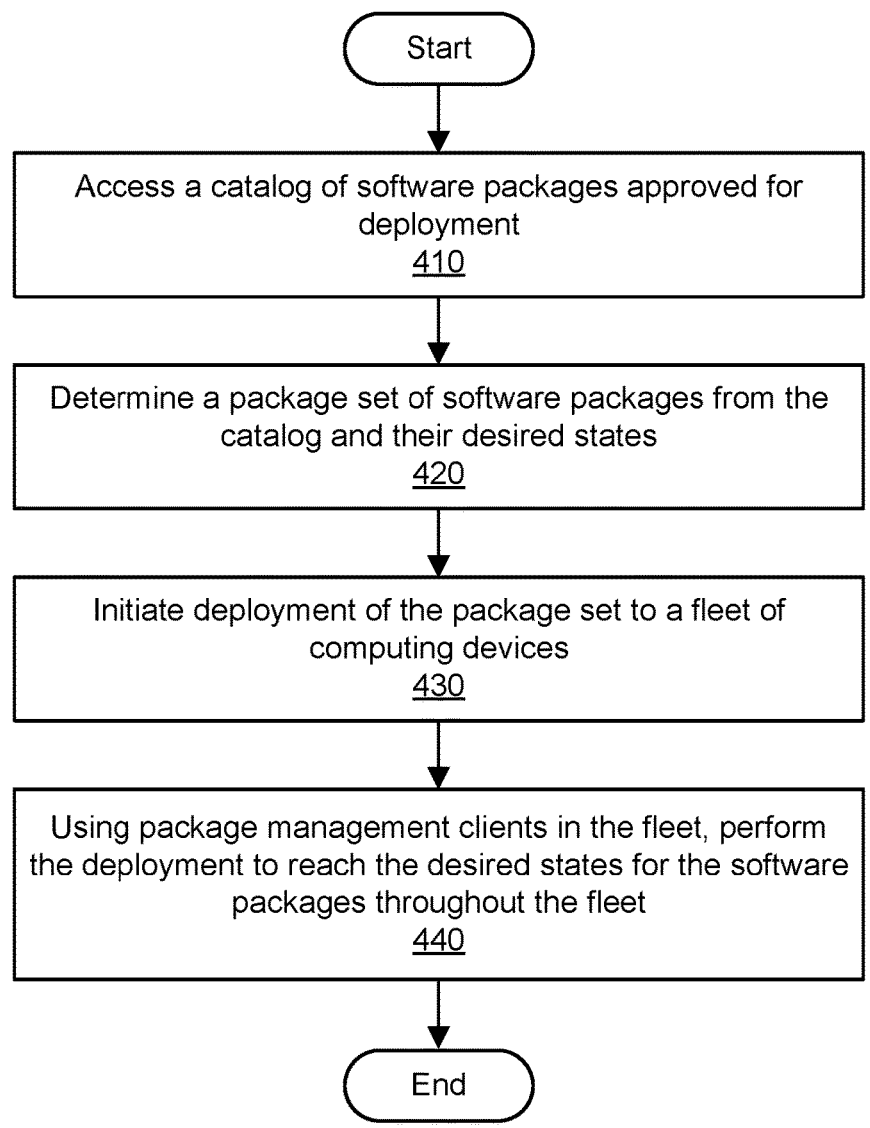
FIG. 4 is a flowchart illustrating a method for fleet-wide management of software packages, including deployment of a package set to reach the desired states for a plurality of software packages throughout a fleet of computing devices, according to one embodiment.

FIG. 4 is a flowchart illustrating a method for fleet-wide management of software packages, including deployment of a package set to reach the desired states for a plurality of software packages throughout a fleet of computing devices, according to one embodiment. As shown in 410, a catalog of software packages may be accessed. The software packages may include standalone applications, patches, updaters, installers, uninstallers, other suitable types of software components, and/or combinations or sets thereof. The catalog may be accessed by a user (e.g., a user of a package management service), and the user may have access privileges to the entire catalog (also referred to herein as the main catalog) or only to particular portions of the catalog. The catalog may be populated with metadata describing the software packages (e.g., names, publishers, version numbers, summaries of functionality, installation requirements, and so on) as well as links to obtain the actual software packages, potentially in one or more other networks and/or storage systems. The catalog may include different numerical versions of the same software package or other variations of the same software, such as platform-specific versions for different platforms. Descriptions of individual software packages may be available for searching and browsing in different portions of the catalog, potentially including a global catalog accessible only to privileged users and/or one or more private catalogs accessible to particular sets of users. The software packages may be approved for deployment by users who have access to the particular portion of the catalog (e.g., a private catalog within the main catalog) to which the users has access privileges. In one embodiment, software packages approved for deployment may be available to users in one or more private catalogs or other portions of the main catalog.

As shown in 420, a package set may be determined. The package set may include metadata identifying one or more software packages and a desired state for each of the software packages. The software packages may be sourced from the catalog, and the package set may include links or other references to obtain the actual software packages for deployment. The package set may be determined by creating a new package set and adding one or more software packages to it, selecting a previously created package set (e.g., as maintained by the package management service and/or catalog), or by selecting and modifying a previously created package set (e.g., by adding one or more software packages, removing one or more software packages, and/or changing the desired state of any software package). The package set may be determined by the user who accessed the catalog, and the package set may include only those software packages to which the user has been granted access in the catalog.

A desired state may represent one or more instructions, including installation and/or uninstallation instructions, with respect to a particular software package on a particular target computing device. The instructions may be conditional and may thus require evaluation of an initial state of the target device. For example, a particular desired state may represent an instruction to install an update if a particular software package is present on the target device. As another example, a particular desired state may represent an instruction to install a particular version of a software package or to install the latest version of a software package. As yet another example, a particular desired state may represent an instruction to uninstall a particular software package if present on a target device. As a further example, a particular desired state may represent an instruction to determine the installation status of a software package but not necessarily take any action to modify the target device.

As shown in 430, deployment of the package set to a fleet of computing devices may be initiated. The deployment may be initiated by the user who accessed the catalog and determined the package set. The computing devices may represent servers or hosts. The fleet may be heterogeneous in terms of capabilities and/or configurations in hardware and/or software. The individual computing devices in the fleet may be selected by the user as part of the deployment. In one embodiment, the deployment may be initiated by a centralized component such as a package management service. The package management service may orchestrate the deployment in conjunction with client-side components on the computing devices, such as package management client software. Each of the computing devices in the fleet may include one or more package management clients, and the package management clients may vary from computing device to computing device. The computing devices may be part of the same network (e.g., a provider network) as the package management service or may instead be part of a client network external to the entity that offers the package management service.

As shown in 440, the deployment of the package set may be performed to reach the desired states for the software packages throughout the individual computing devices in the fleet. Package management clients on the computing devices may assist in the deployment, e.g., by evaluating the current states of the computing devices prior to deployment, determining any operations to perform in order to reach the desired states (by transforming them from the current states), and implementing those operations. For example, if the desired state of a particular software package is to update it only if it is already present on a computing device, then deployment may include determining whether that package is already present on each target device. One computing device on which the package is already present may then be updated, while another computing device on which the package is not present may be left alone (with respect to the particular software package). The individual computing devices in the fleet may vary in their initial states prior to deployment, and the individual computing devices may also vary in their states after deployment of a package set.

Figure 5:
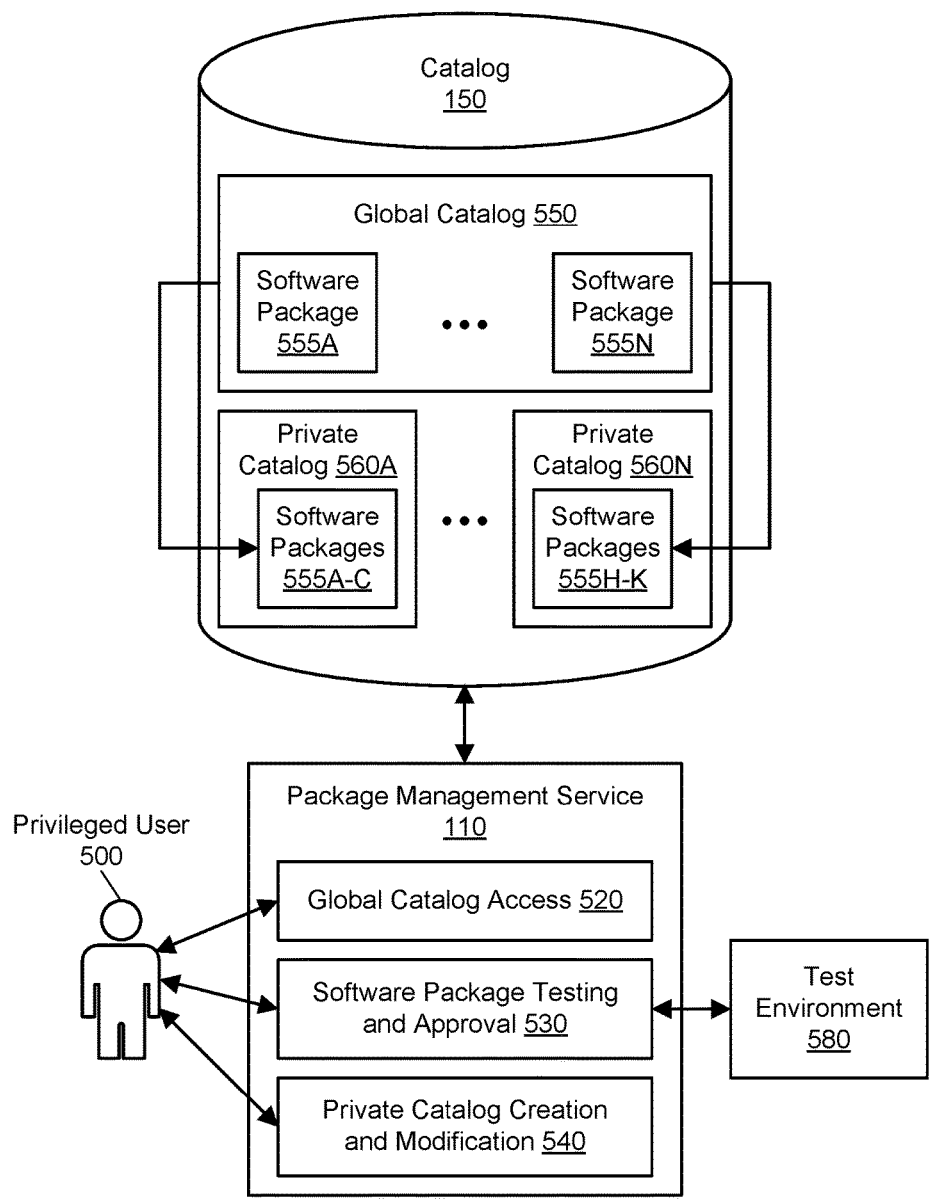
FIG. 5 illustrates further aspects of the example system environment for fleet-wide management of software packages, including a global catalog accessible by a privileged user and a private catalog accessible by other users, according to one embodiment.

FIG. 5 illustrates further aspects of the example system environment for fleet-wide management of software packages, including a global catalog that is fully accessible by a privileged user and private catalogs that are accessible by other users, according to one embodiment. The catalog 150 may include a global catalog 550 and one or more private catalogs, such as private catalogs 560A through 560N. In one embodiment, the global catalog 550 may represent a superset of the package sets in the private catalogs 560A-560N, potentially plus additional software packages not found in any of the private catalogs. For example, as shown in FIG. 5, the global catalog 550 may include software packages 555A through 555N, while private catalog 560A may include software packages 555A through 555C (also found in the global catalog) and private catalog 560N may include software packages 555H through 555K (also found in the global catalog). In one embodiment, the global catalog 550 may be accessible by one or more privileged users. For example, the privileged users may have privileges to read the global catalog, modify the global catalog, deploy software packages from the global catalog, create package sets using packages in the global catalog, and/or create private catalogs. In one embodiment, the global catalog 550 may be inaccessible or not fully accessible to other users (e.g., users of the package management service 110). For example, non-privileged users may be granted read access to the global catalog 550 but may not necessarily be granted access to modify the global catalog, deploy software packages from the global catalog, create package sets using packages in the global catalog, and/or create private catalogs. Each of the private catalogs 560A-560N may be accessible to particular users or groups of users and hidden from other users, e.g., as established by privileged users or administrators.

The software packages in the global catalog 550 may include standalone applications, patches, updaters, installers, uninstallers, other suitable types of software components, and/or combinations or sets thereof. The global catalog 550 may be populated with metadata describing the software packages (e.g., names, publishers, version numbers, summaries of functionality, installation requirements, and so on) as well as links to obtain the actual software packages, potentially in one or more other networks and/or storage systems. The global catalog 550 may include different numerical versions of the same software package or other variations of the same software, such as platform-specific versions for different platforms. Descriptions of individual software packages may be available for searching and browsing in the global catalog 550 by privileged users.

The package management service 110 may include various functionalities to permit a privileged user 500 to perform package management tasks that are inaccessible to other (e.g., non-privileged) users. As shown in FIG. 5, the package management service 110 may include a functionality for global catalog access 520, a functionality for software package testing and approval 530, and a functionality for private catalog creation and modification 540. Using the functionality for global catalog access 520, the privileged user 500 may browse and/or search the global catalog for the software packages 555A-555N. The privilege to access the global catalog 550 and perform particular package management tasks involving the global catalog (and thus be deemed a privileged user) may be granted to a user on an individual basis and/or based on a group affiliation to which the user belongs. As used herein, the term "privileged user" refers to a user (e.g., a user account) who has been granted the privilege to access portions of the catalog and/or functionalities of the package management service 110 to which access is restricted. For example, a set of users who are entrusted to determine the security of software packages may be named as privileged users with respect to the global catalog in order to test software packages and add those packages to private catalogs. The privilege may be granted using an identity and access management (IAM) role that is honored by a package management service associated with the global catalog. For example, the global catalog 550 may be accessed using an application programming interface (API), and the API may be accessible only to a user (e.g., the privileged user 500) having a particular IAM role.

Using the functionality for software package testing and approval 530, the privileged user 500 may be permitted to test one or more software packages in the global catalog 550. For example, the privileged user 500 may browse or search the global catalog 550 for newly released and untested software packages. The privileged user 500 may select any of the software packages in the global catalog 550 and deploy them in a test environment 580. In one embodiment, the privileged user 500 may create, select, and/or modify a package set of multiple software packages for testing purposes. In one embodiment, the privileged user 500 may permit a non-privileged user to deploy one or more software packages to the test environment 580 or another specific environment or fleet. The test environment 580 may include a set of computing devices that may be isolated from other systems and networks (e.g., a production environment that actually interacts with customers or clients of an organization). Testing the software packages may include executing them in the test environment 580 and monitoring the execution and/or the results of the execution. The testing may be performed prior to approving the deployment of the package set to a fleet in a production environment. The testing may include a security review, and the privileged user 500 may represent a security reviewer. Based on the monitoring and/or results, the privileged user 500 may approve any of the software packages that are tested in this manner. Approval of a software package may be recorded in the catalog 150 based on user input from the privileged user 500.

Using the functionality for private catalog creation and modification 540, the privileged user 500 may be permitted to add one or more software packages from the global catalog 550 to one or more of the private catalogs 560A-560N. The packages to be added to the private catalog(s) may be the packages that were tested and approved using the functionality for software package testing and approval 530. The private catalog(s) may exist as part of the main catalog that also includes the global catalog. The privileged user 500 may have the privilege to create and/or modify private catalogs 560A-560N using the functionality for private catalog creation and modification 540. When a package set is added to a private catalog from the global catalog 550 by the privileged user 500, the addition may represent approval to deploy the software package to computing devices managed by users who have access to that private catalog. In one embodiment, a privileged user 500 may call APIs to create a catalog, delete a catalog, list catalogs in the customer's account, describe metadata for a catalog, add a software package from the global catalog to a private catalog, and remove a software package from a private catalog.

In one embodiment, membership of a software package in a private catalog may be determined based on a whitelist, a blacklist, a set of one or more rules, or a combination thereof. The whitelist may indicate explicit inclusion of one or more software packages in the private catalog. The blacklist may indicate explicit exclusion of one or more software packages in the private catalog. The rules may represent other criteria for inclusion and may be overridden by a whitelist and/or blacklist, if any. For example, a particular rule may be evaluated using pattern-matching techniques to cause inclusion of new software updates to operating system software released by a particular publisher. Software packages may be added to one or more private catalogs based on user input by the privileged user 500 that specifically identifies the package(s) and the private catalog(s) or instead based on automatic and programmatic evaluation of the whitelist and/or rules. For example, when a software package is newly approved for deployment, then the whitelists, blacklists, and rules (if any) for existing private catalogs may be evaluated relative to the newly approved package. As another example, when the membership of a private catalog is queried (e.g., using an appropriate API), then the whitelist, blacklist, and rules (if any) for the private catalog may be evaluated. The whitelist, blacklist, and/or rules for a private catalog may be created or modified by the privileged user 500 who has access to the global catalog 550. In one embodiment, a privileged user 500 may call APIs to set rules to populate a private catalog from the global catalog based on defined filter criteria, read the rules for a private catalog, and/or delete the rules for a private catalog. When access to a particular software package is revoked by a privileged user or administrator, existing package sets that include the particular software package may be left in the catalog and deemed immutable or may instead be purged of the particular software package.

Figure 6:
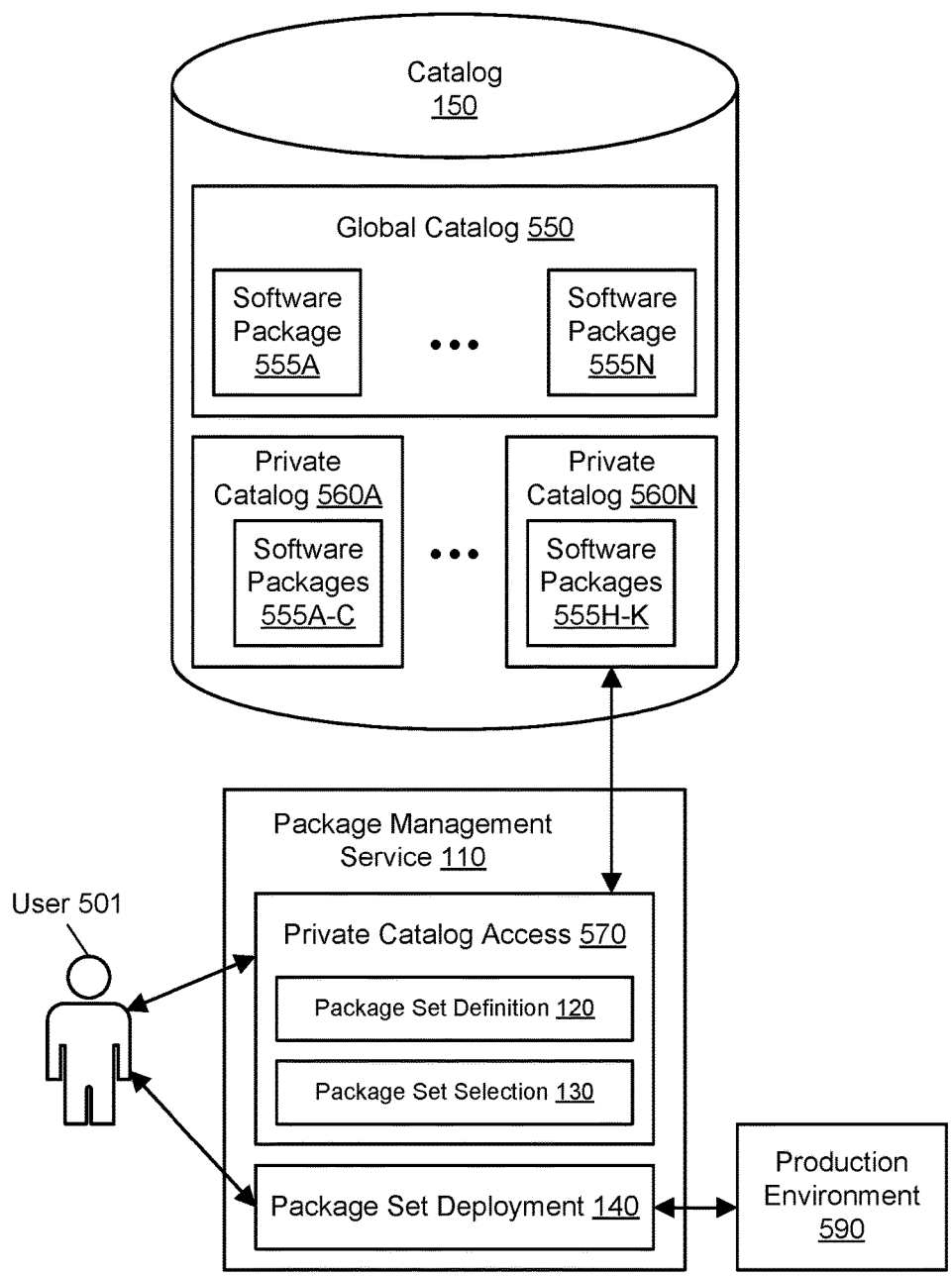
FIG. 6 illustrates further aspects of the example system environment for fleet-wide management of software packages, including creation of a package set using software packages in a private catalog, according to one embodiment.

FIG. 6 illustrates further aspects of the example system environment for fleet-wide management of software packages, including creation of a package set using software packages in a private catalog, according to one embodiment. An additional user (also referred to as a non-privileged user) 501 may be permitted to access (e.g., read) a private catalog that contains software packages approved for deployment. In one embodiment, the package management service 110 may include a functionality for private catalog access 570 that implements the functionality for package set definition 120 and/or the functionality for package set selection 130. For example, the user 501 may be permitted to access the private catalog 560N using the functionality for private catalog access 570. The additional user 501 may have access to the private catalog 560N but not necessarily to the global catalog 550 or to other private catalogs such as catalog 560A. Access to the particular private catalog 560N may be granted to the user 501 and optionally other users (also referred to here as non-privileged users) who may not have access to the global catalog 550, and the existence and contents of the private catalog 560N may be hidden from other users. Access to the private catalog 560N may be granted using an identity and access management (IAM) role for the user 501 that is honored by the package management service 110. For example, the private catalog 560N may be accessed using an application programming interface (API), and the API may be accessible only to a user (e.g., the user 500) having a particular IAM role. The additional user 501 may have privileges to browse or search the private catalog 560N, create a package set based on the software packages 555H-555K, select a predetermined package set, and/or deploy the package set to computing devices managed by that user. For example, the user 501 may deploy a package set to a production environment 590 that interacts with real-world customers or clients of an organization. In one embodiment, the privileged user 500 may permit the non-privileged user 501 to deploy a package set to the test environment 580 or another specific environment or fleet. Deployment may be automated based on suitable rules and/or schedules. Deployment may also be performed in a "rolling" manner to update only a portion of a fleet in any particular window of time. In one embodiment, a user 501 may call APIs to create a package set, delete a package set, get a list of package sets in the customer's account, return metadata describing a package set, add one or more software packages to a package set, remove one or more software packages from a package set, set the desired state for a software package in a package set, list the software packages in a package set that match a specified filter. In one embodiment, a user 501 may call APIs to set rules defining which software packages should be automatically added to the package set from a specified catalog, read the inclusion rules for a package set, and/or delete the inclusion rules for a package set.

Figure 7:
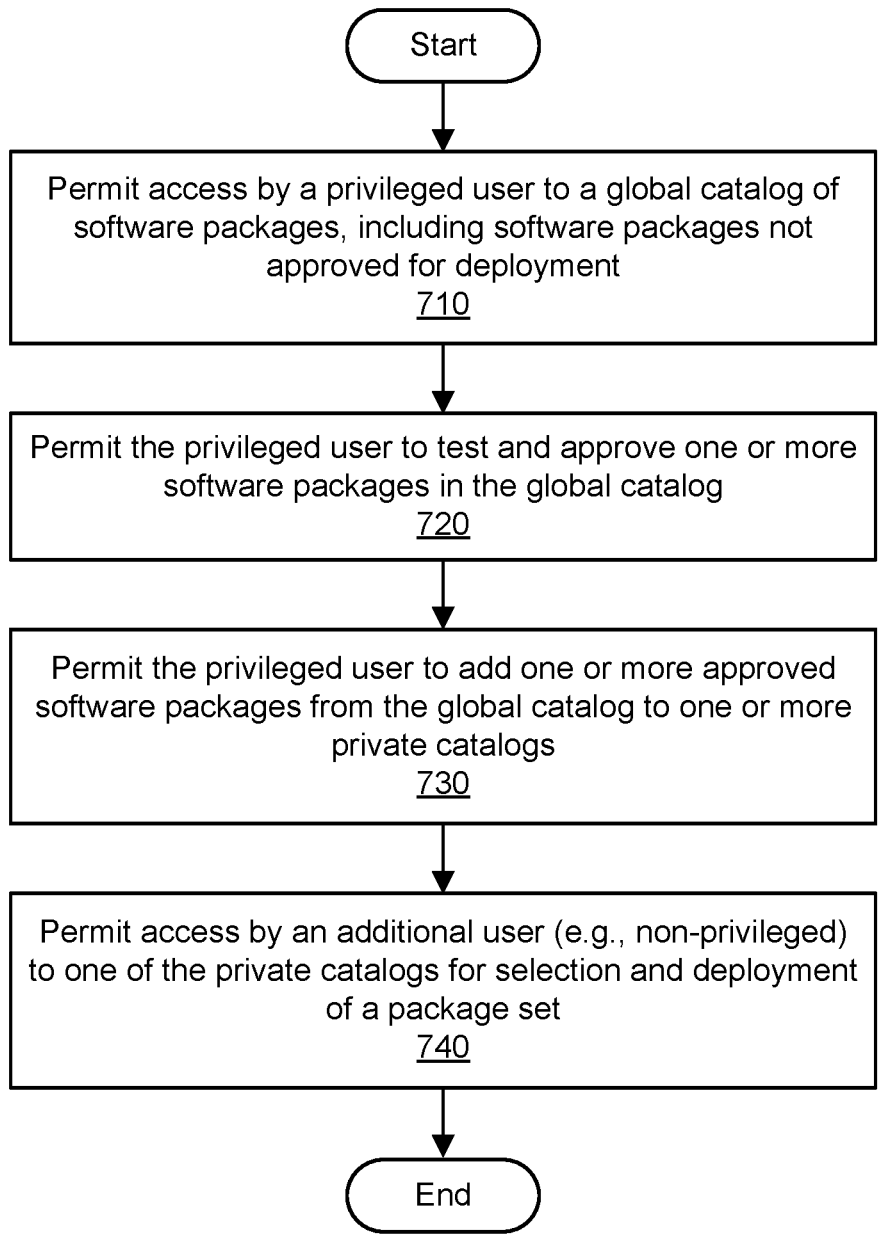
FIG. 7 is a flowchart illustrating a method for fleet-wide management of software packages, including approval of software packages by a privileged user for deployment by other users in a package set, according to one embodiment.

FIG. 7 is a flowchart illustrating a method for fleet-wide management of software packages, including approval of software packages by a privileged user for deployment by other users in a package set, according to one embodiment.

As shown in 710, a privileged user may be permitted access to a global catalog of software packages. The global catalog may be accessible to one or more privileged users and inaccessible or not fully accessible to one or more additional (e.g., non-privileged) users. The privilege to access the global catalog and perform package management tasks related to the global catalog (and thus be deemed a privileged user) may be granted to a user on an individual basis and/or based on a group affiliation to which the user belongs. For example, a set of users who are entrusted to determine the security of software packages may be named as privileged users with respect to the global catalog. The privilege may be granted using an identity and access management (IAM) role that is honored by a package management service associated with the global catalog. For example, the global catalog may be accessed using an application programming interface (API), and the API may be accessible only to a user having a particular role. The global catalog may be a section of a main catalog, and the main catalog may include other sections such as private catalogs. In one embodiment, the global catalog may represent a superset of the package sets in the private catalogs, potentially plus additional software packages not found in any of the private catalogs.

The software packages in the global catalog may include standalone applications, patches, updaters, installers, uninstallers, other suitable types of software components, and/or combinations or sets thereof. The global catalog may be populated with metadata describing the software packages (e.g., names, publishers, version numbers, summaries of functionality, installation requirements, and so on) as well as links to obtain the actual software packages, potentially in one or more other networks and/or storage systems. The global catalog may include different numerical versions of the same software package or other variations of the same software, such as platform-specific versions for different platforms. Descriptions of individual software packages may be available for searching and browsing in the global catalog by privileged users.

As shown in 720, the privileged user may be permitted to test one or more software packages in the global catalog. The privileged user may browse or search the global catalog, e.g., for newly released and untested software packages. The privileged user may select any of the software packages and deploy them in a test environment. In one embodiment, the privileged user may create, select, and/or modify a package set of multiple software packages for testing purposes. The test environment may include a set of computing devices that may be isolated from other systems and networks (e.g., a production environment that actually interacts with customers or clients of an organization). Testing the software packages may include executing them in the test environment and monitoring the execution and/or the results of the execution. The testing may be performed prior to approving the deployment of the package set to a fleet in a production environment. Based on the monitoring and/or results, the privileged user may approve any of the software packages that are tested in this manner. Approval of a software package may be recorded in the catalog 150 based on user input.

As shown in 730, the privileged user may be permitted to add one or more software packages from the global catalog to one or more private catalogs. The packages to be added to the private catalog(s) may be the packages that were tested and approved as shown in 720. The private catalog(s) may exist in the main catalog that also includes the global catalog. The privileged users may have the privilege to create and/or modify private catalogs. Access to a particular private catalog may be granted to particular sets of additional users (also referred to here as non-privileged users) who may not have access to the global catalog. Access to a private catalog may be granted using an identity and access management (IAM) role that is honored by a package management service associated with the private catalog. When a package set is added to a private catalog from the global catalog by a privileged user, the addition may represent approval to deploy the software package to computing devices managed by users who have access to that private catalog.

In one embodiment, membership in a private catalog may be determined based on a whitelist, a blacklist, a set of one or more rules, or a combination thereof. The whitelist may indicate explicit inclusion of one or more software packages in the private catalog. The blacklist may indicate explicit exclusion of one or more software packages in the private catalog. The rules may represent other criteria for inclusion and may be overridden by a whitelist and/or blacklist, if any. For example, a particular rule may be evaluated using pattern-matching techniques to cause inclusion of new software updates to operating system software released by a particular publisher. Software packages may be added to one or more private catalogs based on user input by a privileged user that specifically identifies the package(s) and the private catalog(s) or instead based on automatic and programmatic evaluation of the whitelist and/or rules. For example, when a software package is newly approved for deployment, then the whitelists, blacklists, and rules (if any) for existing private catalogs may be evaluated relative to the newly approved package. The whitelist, blacklist, and/or rules for a private catalog may be created or modified by privileged users who have access to the global catalog.

As shown in 740, an additional user may be permitted to access a private catalog that contains software packages approved for deployment. The additional user may have access to the private catalog but not necessarily to the global catalog. The additional user may have privileges to browse or search the private catalog, create a package set, select a package set, and/or deploy a package set to a particular fleet or selection of computing devices (e.g., servers managed by that user). Such operations with respect to package sets may be performed by the additional user as discussed with reference to 420, 430, and 440 of FIG. 4.

APIs and Usage Examples

The package management service 110 may include various configuration parameters and application programming interfaces (APIs) representing functionality available to administrators (e.g., privileged users). In one embodiment, a package management configuration may define a target fleet, the package set to use for the target fleet, deployment settings (e.g., the minimum number of healthy instances in the fleet), any script(s) to perform starting and/or stopping of workloads in the fleet, and any script(s) to validate that an instance in the fleet is healthy after deployment. A client of the package management service 110 may run a software package assessment or deployment explicitly (e.g., using a StartPackageManagerUpdateWorkflow API) or based on a schedule (e.g., using a CreateSchedule API). APIs offered by the package management service 110 may include catalog APIs, package set APIs, workflow APIs, status APIs, package management configuration APIs, scheduling APIs, and agent APIs.

Catalog APIs may include APIs relevant to the global catalog, private catalogs, private catalog automation, and notifications. APIs relevant to the global catalog may include DescribeSoftwarePackages that provides specific information about software packages, including metadata identifying aspects of the software packages and providing vendor guidance. DescribeSoftwarePackages may take the arguments CatalogName (optional; if not specified, uses the global catalog), Filter (filters on package-level metadata), and allVersions (include all software packages that match the filters). By default, DescribeSoftwarePackages may return only the latest version of the software package that matches all the filters. APIs relevant to the private catalog may include CreateCatalog, DeleteCatalog, ListCatalogs, DescribeCatalog, AddSoftwarePackageToCatalog, and RemoveSoftwarePackageFromCatalog. CreateCatalog may create a private catalog with the argument CatalogName. DeleteCatalog. may delete a private catalog with the argument CatalogName. ListCatalogs may get a list of private catalogs in the customer's account. DescribeCatalog may return metadata about a private catalog with the argument CatalogName. AddSoftwarePackageToCatalog may add a software package from the global catalog to a private catalog with the arguments CatalogName and SoftwarePackageID. RemoveSoftwarePackageFromCatalog may remove a software package from a private catalog with the arguments CatalogName and SoftwarePackageID.

APIs relevant to private catalog automation may include SetCatalogAutoInclusionConfiguration, GetCatalogAutoInclusionConfiguration, and DeleteCatalogAutoInclusionConfiguration. SetCatalogAutoInclusionConfiguration may set rules to populate a private catalog from the global catalog based on defined filter criteria and may take the arguments CatalogName, metadataMatchFilterBehavior (matching any of these filters results in the software package being added to the private catalog using the rule from the first match), and email (optional; an address to send a notification when new items are moved into a package set). GetCatalogAutoInclusionConfiguration reads the rules for a private catalog with the argument CatalogName, and DeleteCatalogAutoInclusionConfiguration deletes the rules for a private catalog with the argument CatalogName. APIs relevant to notifications may include GetCatalogAvailabilityNotificationConfiguration, SetCatalogAvailabilityNotificationConfiguration, and DeleteCatalogAvailabilityNotificationConfiguration. GetCatalogAvailabilityNotificationConfiguration may retrieve an availability notification configuration with the optional argument CatalogName (if not specified, targets the global catalog). SetCatalogAvailabilityNotificationConfiguration may set a notification configuration for when new software becomes available in a catalog with the arguments CatalogName (optional; if not specified, targets the global catalog), metadataMatchFilterBehavior (matching any of these filters results in a notification being sent that new software is available), and email (an address to send a notification when new software becomes available). DeleteCatalogAvailabilityNotificationConfiguration may delete an availability notification configuration with the optional argument CatalogName (if not specified, targets the global catalog).

Package set APIs may include APIs relevant to CRUD (create, read, update, delete), content management, automation, and notifications. The CRUD package set APIs may include CreatePackageSet to create a package set with the argument PackageSetName, DeletePackageSet to delete a package set with the argument PackageSetName, ListPackageSets to get a list of package sets in the customer's account, and DescribePackageSet to return metadata about a package set with the argument PackageSetName. The content management package set APIs may include AddSoftwarePackagesToPackageSet, RemoveSoftware- PackagesFromPackageSet, SetSoftwarePackageDesiredStateInPackage Set, and DescribeSoftwarePackagesInPackageSet. AddSoftwarePackagesToPackageSet may add one or more software packages (identified by SoftwarePackageIDs) to a package set (identified by PackageSetName) with the additional arguments Source (a private catalog if specified, otherwise the global catalog) and DesiredState (the desired state of the software packages in the package set such as install, uninstall, determine status, and so on). RemoveSoftwarePackagesFromPackageSet may remove one or more software packages (identified by SoftwarePackageIDs) from a package set (identified by PackageSetName). SetSoftwarePackageDesiredStateInPackageSet may set a desired state (identified by DesiredState) for a software package (identified by a SoftwarePackageID) to a package set (identified by PackageSetName). DescribeSoftwarePackagesInPackageSet may list the software packages in a package set (identified by PackageSetName) that match the specified filter (identified by the argument Filter) with the optional argument AllVersions (returns all versions of software instead of only the most recent; by default, the API returns only the most recent version).

The automation package set APIs may include SetPackageSetAutoInclusionConfiguration, GetPackageSetAutoInclusionConfiguration, and DeletePackageSetAutoInclusionConfiguration. SetPackageSetAutoInclusionConfiguration may set the rules that define what software packages should be automatically added to the package set (identified by PackageSetName) from the specified catalog (identified by an optional argument CatalogName; the default is the global catalog) with the arguments metadataMatchFilterBehavior (matching any of these filters results in the software package being copied to the package set using the rule from the first match), and email (an address to send a notification when new items are moved into a package set). GetPackageSetAutoInclusionConfiguration may read the inclusion rules for a package set (identified by PackageSetName), and DeletePackageSetAutoInclusionConfiguration may delete the inclusion rules for a package set (identified by PackageSetName). The notification package set APIs may include APIs relevant to notifications may include GetSoftwareAvailabilityNotificationConfiguration, SetSoftwareAvailabilityNotificationConfiguration, and DeleteSoftwareAvailabilityNotificationConfiguration. GetSoftwareAvailabilityNotificationConfiguration may retrieve an availability notification configuration with the argument PackageSetName. SetSoftwareAvailabilityNotificationConfiguration may set a notification configuration for when new software packages becomes available in a package set with the arguments PackageSetName, metadataMatchFilterBehavior (matching any of these filters results in a notification being sent that new software is available), and email (an address to send a notification when new software becomes available). DeleteSoftwareAvailabilityNotificationConfiguration may delete an availability notification configuration with the argument PackageSetName.

Workflow APIs may include APIs relevant to control, such as StartPackageManagerUpdateWorkflow, CancelPackageManagerUpdateWorkflow, and DescribePackageManagerUpdateWorkflow. StartPackageManagerUpdateWorkflow may trigger a workflow that determines what updates are applicable with the arguments ConfigName (the package management configuration) and Pretend (determines what updates would be applied to the system but does not apply them, e.g., to assess or deploy). CancelPackageManagerUpdateWorkflow may cancel a currently executing workflow (identified by WorkflowID). DescribePackageManagerUpdateWorkflow may describe workflows from a preceding period (e.g., the last ninety days) with the argument Filter (e.g., fleet names, workflowIDs); the results may indicate the overall progress for an ongoing update, the fleet name, the package set name, the data, and other relevant details.

Status APIs may include GetPackageManagerUpdateWorkflowResults and GetInstanceChangesHistory. GetPackageManagerUpdateWorkflowResults may retrieve the results of a workflow (identified by WorkflowID), including the instances that participated in the workflow and the result (e.g., success, complete failure, or partial failure), the state of each software package from the package set for each instance (including the success or failure if a deployment action was required), with the argument ChangeFilter (filter instances from the output based on changes made). GetInstanceChangesHistory may retrieves workflows that have been executed for the instance (identified by InstanceID), the post-workflow state of each software package from the package set on the instance, the fleet associated with the workflow execution, and the version of the package set used for the workflow.

Package management configuration APIs may include SetPackageManagementConfiguration, DeletePackageManagementConfiguration, ListPackageManagementConfiguration, and DescribePackageManagementConfiguration. SetPackageManagementConfiguration may create or update a package management configuration with the arguments ConfigurationName, FleetName, RollingConfiguration (the configuration used for rolling deployments, e.g., 95% of the fleet must be working to continue), StopScript (optional; a named script for stopping the workload on an instance in the fleet), StartScript (optional; a named script for starting the workload on an instance in the fleet), HealthScript (optional; a named script for verifying the health of an instance in the fleet before determining the success of the deployment), and PackageSet. DeletePackageManagementConfiguration may delete a package management configuration (identified by ConfigurationName). ListPackageManagementConfiguration may get a list of package management configurations for the customer's account. DescribePackageManagementConfiguration may return metadata about a package management configuration (identified by ConfigurationName).

Scheduling APIs may include SetSchedule, DeleteSchedule, ListSchedules, and DescribeSchedule. SetSchedule may create or update a schedule (identified by ScheduleName) with the arguments Config (the package management configuration) Pretend (determines what updates would be applied to the system but does not apply them, e.g., to assess or deploy), Expression (a cron expression determining the schedule), and TimeZone. DeleteSchedule may delete a schedule (identified by ScheduleName). ListSchedules may return a list of schedules for a customer's account with the argument NextToken (for pagination). DescribeSchedule may return detailed information for a specific schedule (identified by ScheduleName).

Agent APIs may include SetPackageUpdatePlan, SetPackageUpdateResult, and Sync. SetPackageUpdatePlan may be used by the agent on the target computing device to inform the package management service of planned changes before they are made with the argument WorkflowID. SetPackageUpdateResult may be used by the agent on the target computing device to inform the package management service of actual changes that are made with the argument WorkflowID. Sync may retrieve the current versions of software known to the package set (identified by PackageSetName) along with guidance on what to install and how.

Examples of API usage are discussed below. These examples are included for purposes of illustration and are not intended to be limiting. In one embodiment, a customer may set up automatic deployment of operating system updates and virtualized computing configuration updates every Saturday at 1 am as follows:

[
    {[{"Publisher", "Company X"}, {"Type", "Hotfix"}], "Latest"},
    {[{"Publisher", "Company Y"}, {"Name", "Config-Service"}], "Latest"
    }]}
]);
SetPackageManagementConfiguration( "Finance Configuration", "Finance", "90% healthy",
    "//pathname/startscript.psl",
    "//pathname/stopscript.psl",
    "//pathname/healthcheck.psl",
    "Finance Package Set");
SetSchedule( "Fianace Schedule", "Finance Configuration", "Deploy", "0 0 22?* TUE,THU *", "PDT");

In one embodiment, the same deployment may be implemented using a two-stage approval process as follows. In the first stage, a top-level administrator (a privileged user) may create a private catalog and automatically approve all OS updates and configuration updates, but only version 4.2 of the paravirtual drivers:

CreateCatalog("Security Approved Software Packages")
SetCatalogAutoInclusionConfiguration("Security Approved Software Packages",
[
    [{"Publisher", "Company X"}, {"Type", "Hotfix"}],
    <[{"Publisher", "Company Y"}, {"Name", "Config-Service"}],
    [{"Publisher", "Company Y"}, {"Name", "PV Drivers"}, {"Version", "4.2"}]
]);

With the private catalog created as shown above, a fleet-level administrator may schedule the deployment as follows:

[
    {[{"Publisher", "Company X"}, {"Type", "Hotfix"}], "Install"},
    {[{"Publisher", "Company Y"}, {"Name", "Config-Service"}], "Install"
    }]}
]);
SetPackageManagementConfiguration( "Finance Configuration", "Finance", "90% healthy",
    "//pathname/startscript.psl",
    "//pathname/stopscript.psl",
    "//pathname/healthcheck.psl",
    "Finance Package Set");
SetSchedule( "Fianace Schedule", "Finance Configuration", "Deploy", "0 0 22?* TUE,THU *", "PDT");

In the above examples, KB12345 may be an operating system update that is included automatically in the Finance Package Set. In a further example, this software package has a conflict with the applications running on the Finance fleet, so the fleet-level administrator may seek to prevent it from being deployed. To remove KB12345 from the package set the fleet-level administrator may perform, as follows:

packageId=DescribeSoftwarePackagesInPackageSet("Finance Package Set", [{"VendorId", "KB12345"}]);
RemoveSoftwarePackagesFromPackageSet("Finance Package Set", [packageId]);

To change the desired state of KB12345 in the package set to only scan for it, the fleet-level administrator may perform, as follows:

packageId=DescribeSoftwarePackagesInPackageSet("Finance Package Set", [{"VendorId", "KB12345"}]);
SetSoftwarePackageDesiredStateInPackageSet("Finance Package Set", packageId, "Scan");

To determine the most recent state of the fleet after the deployment in the above examples, the fleet-level administrator may perform, as follows:

workflowId=DescribePackageManagerUpdateWorkflows ([{"Fleet", "Finance" }, {"WorkflowId", "Latest"]);
workflowResult=GetPackageManagerUpdateWorkflowResults(workflowId);

The returned workflow result may contain structured data, including the number of instances that participated in the workflow (e.g., if the fleet at the time contained 75 instances, but 20 of them were stopped, only 55 instances would have participated in the workflow), the top-level result for each instance (e.g., it succeeded, completely failed, or partially failed), and the state of each software package included in the package set from each instance (e.g. "not applicable," "already installed," "installed," and so on).

If performance testing has revealed that version 4.3 of the paravirtual drivers work best for this particular fleet, then the fleet-level administrator may ensure that only that version is deployed:

packageId=DescribeSoftwarePackages([{"Vendor", "Company Y"}, {"Name", "PV Drivers"}, {"Version", "4.3"}]);
AddSoftwarePackagesToPackageSet("Finance Package Set", packageId, "Pinned");

To find instances in the fleet with a particular software package KB56789 installed or not installed, the fleet-level administrator may perform the following steps and look for instances where the state is "installed" or "not present," respectively:

CreatePackageSet("KB56789 Check");
packageId=DescribeSoftwarePackages([{"VendorId", "KB12345"}]);
AddSoftwarePackagesToPackageSet("KB56789 Check", packageId, "Scan");
SetPackageManagementConfiguration("KB56789 Configuration", "Finance", "0% healthy", "KB56789 Check");
workflowId=StartPackageManagerUpdateWorkflow ("KB56789 Configuration", "Assess");
<wait for scan to complete>
workflowResult=GetPackageManagerUpdateWorkflowResults(workflowId);
<process the workflow result>

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of servers in a fleet, wherein the servers comprise package management clients; and
one or more computing devices comprising one or more hardware processors and memory that implement a package management service configured to:
grant, to one or more privileged users, access to a global catalog of software packages based on a role associated with the one or more privileged users;
add a package set from the global catalog to a private catalog based on input from the one or more privileged users, wherein the package set comprises metadata identifying a plurality of software packages and respective installation instructions for the software packages, wherein the respective installation instructions represent respective desired states for the software packages, the private catalog comprising the plurality of software packages and a plurality of additional software packages approved for deployment by one or more of the privileged users;
grant, to an additional user, access to the private catalog based on a different role associated with the additional user, wherein the global catalog is inaccessible to the additional user;
select from the private catalog the package set to be deployed based on input from the additional user; and
initiate deployment of the package set to the plurality of servers in the fleet; and
wherein, to perform the deployment, the package management clients are configured to:
implement the respective installation instructions for the software packages, wherein the respective desired states are reached for the plurality of software packages for the plurality of servers in the fleet.

2. The system as recited in claim 1, wherein a particular installation instruction for a particular software package in the package set comprises installation of an update if the particular software package is present, wherein the package management clients are configured to:
install the update for a first server in the fleet on which the particular software package is present; and
decline to install the update for a second server in the fleet on which the particular software package is not present.

3. The system as recited in claim 1, wherein a first installation instruction for a first software package in the package set represents unconditional installation of the first software package, wherein a second installation instruction for a second software package in the package set represents conditional installation of the second software package, wherein the first software package is installed on a first server in the fleet, and wherein the second software package is installed on the first server in the fleet only if a particular condition is met.

4. The system as recited in claim 1, wherein the global catalog comprises the plurality of software packages and other software packages, wherein the global catalog is accessible to the one or more privileged users, and wherein the plurality of software packages in the package set are approved for deployment to the fleet based on input from one or more of the privileged users.

5. A computer-implemented method, comprising:
granting to one or more privileged users, by one or more computing devices that implement a package management service, access to a global catalog of software packages based on a role associated with the one or more privileged users;
adding, by the one or more computing devices that implement the package management service, a package set from the global catalog to a private catalog based on input from the one or more privileged users, the package set comprising metadata identifying a plurality of software packages and desired states associated with the software packages, wherein the plurality of software packages are approved for deployment by one or more of the privileged users, and wherein the package management service is offered to a plurality of clients in a multi-tenant environment;
granting to an additional user, by the one or more computing devices that implement a package management service, access to the private catalog based on a different role associated with the additional user, wherein the global catalog is inaccessible to the additional user;
selecting from the private catalog, by the one or more computing devices that implement a package management service, the package set to be deployed based on input from the additional user; and
initiating, by the one or more computing devices that implement the package management service, deployment of the package set to a plurality of computing devices, wherein the deployment comprises reaching the desired states associated with the plurality of software packages for the plurality of computing devices.

6. The method as recited in claim 5, wherein the deployment is implemented using one or more package management clients installed on the plurality of computing devices, wherein, using the one or more package management clients, the method further comprises:
determining current states with respect to the plurality of software packages in the package set for the plurality of computing devices;
determining one or more operations to transform the plurality of computing devices from the current states to the desired states for the plurality of software packages in the package set; and
performing the one or more operations to reach the desired states.

7. The method as recited in claim 5, wherein a desired state associated with a particular software package in the package set comprises installation of an update.

8. The method as recited in claim 5, wherein a desired state associated with a particular software package in the package set comprises installation of a particular version or a most recent version of the particular software package.

9. The method as recited in claim 5, wherein a desired state associated with a particular software package in the package set comprises uninstallation of the particular software package.

10. The method as recited in claim 5, wherein the global catalog comprises the plurality of software packages and a plurality of additional software packages, wherein the catalog is accessible to the one or more privileged users, and wherein the plurality of software packages in the package set are approved for deployment to the fleet based on input from one or more of the privileged users.

11. The method as recited in claim 10, further comprising:
initiating testing of the plurality of software packages in a test environment.

12. The method as recited in claim 10, wherein the global catalog further comprises a private catalog created by one or more of the privileged users, and wherein the method further comprises:
adding the plurality of software packages to the private catalog after the plurality of software packages are approved for deployment, wherein the package set is selected from the private catalog and deployed based on input from the additional user.

13. The method as recited in claim 12, wherein membership in the private catalog is determined based on a whitelist, a blacklist, a set of rules, or a combination thereof.

14. A non-transitory computer-readable storage medium storing program instructions computer-executable to perform:
granting to one or more privileged users access to a global catalog of software components based on a role associated with the one or more privileged users;
adding a package set from the global catalog to a private catalog based on input from the one or more privileged users, the package set identifying a plurality of software components and desired states associated with the software components, wherein the plurality of software components are approved for deployment by one or more of the privileged users, wherein the package set is added using a package management service, and wherein the package management service is offered to a plurality of clients in a multi-tenant environment;
granting to an additional user access to the private catalog based on a different role associated with the additional user, wherein the global catalog is inaccessible to the additional user;
selecting from the private catalog the package set to be deployed based on input from the additional user; and
initiating deployment of the package set to a plurality of computing devices, wherein the deployment comprises reaching the desired states associated with the plurality of software components for the plurality of computing devices.

15. The non-transitory computer-readable storage medium as recited in claim 14, wherein the deployment is implemented using one or more package management clients installed on the plurality of computing devices, wherein, using the one or more package management clients, the program instructions are further computer-executable to perform:
determining current states with respect to the plurality of software components in the package set for the plurality of computing devices;
determining one or more operations to transform the plurality of computing devices from the current states to the desired states for the plurality of software components in the package set; and
performing the one or more operations to reach the desired states.

16. The non-transitory computer-readable storage medium as recited in claim 14, wherein a desired state associated with a particular software component in the package set comprises installation of an update.

17. The non-transitory computer-readable storage medium as recited in claim 14, wherein a desired state associated with a particular software component in the package set comprises installation of a particular version or a most recent version of the particular software component.

18. The non-transitory computer-readable storage medium as recited in claim 14, wherein a first desired state associated with a first software component in the package set represents unconditional installation of the first software component, wherein a second desired state associated with a second software component in the package set represents conditional installation of the second software component, wherein the first software component is installed on a particular one of the computing devices, and wherein the second software component is installed on the particular one of the computing devices only if a particular condition is met.

19. The non-transitory computer-readable storage medium as recited in claim 14, wherein the global catalog comprises the plurality of software components and a plurality of additional software components, wherein the global catalog is accessible to the one or more privileged users, and wherein the plurality of software components in the package set are approved for deployment to the computing devices based on input from one or more of the privileged users.

20. The non-transitory computer-readable storage medium as recited in claim 19, wherein the global catalog further comprises a private catalog created by one or more of the privileged users, and wherein the program instructions are further computer-executable to perform:
adding the plurality of software components to the private catalog after the plurality of software components are approved for deployment, wherein the package set is selected from the private catalog and deployed based on input from the additional user.

* * * * *